(12) United States Patent
Nakagawa et al.

(10) Patent No.: US 9,460,537 B2
(45) Date of Patent: Oct. 4, 2016

(54) INFORMATION PROCESSING APPARATUS, INFORMATION PROCESSING METHOD, AND STORAGE MEDIUM

(75) Inventors: Kenichiro Nakagawa, Tokyo (JP); Makoto Hirota, Tokyo (JP); Rei Ishikawa, Wako (JP); Masayuki Ishizawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 274 days.

(21) Appl. No.: 12/960,597

(22) Filed: Dec. 6, 2010

(65) Prior Publication Data

US 2011/0157188 A1   Jun. 30, 2011

(30) Foreign Application Priority Data

Dec. 24, 2009  (JP) .................................. 2009-293203
Nov. 18, 2010  (JP) .................................. 2010-258298

(51) Int. Cl.
*G06T 13/00*   (2011.01)

(52) U.S. Cl.
CPC ..................................... *G06T 13/00* (2013.01)

(58) Field of Classification Search
CPC ....... G06T 13/80; G06T 13/00; G06T 13/40; G06T 13/20; G06T 13/60; G06T 19/20; G06T 11/206; G06T 11/60; G06T 17/20; G06T 19/00; G06T 2213/08; G06F 8/38; B25J 9/1671
USPC ......... 345/473, 173, 224; 382/173, 473, 224
See application file for complete search history.

(56) References Cited

U.S. PATENT DOCUMENTS

| 5,214,758 | A | * | 5/1993 | Ohba | ....................... | G06T 13/40 |
| | | | | | | 345/168 |
| 7,598,956 | B2 | | 10/2009 | Strawn et al. | | |
| 7,620,236 | B2 | | 11/2009 | Hirota et al. | | |
| 7,657,055 | B2 | | 2/2010 | Katayama et al. | | |
| 7,908,556 | B2 | | 3/2011 | Shamma et al. | | |
| 2002/0130873 | A1 | * | 9/2002 | Takakura et al. | ............. | 345/473 |
| 2003/0023347 | A1 | * | 1/2003 | Konno | ................... | B25J 9/1671 |
| | | | | | | 700/245 |

(Continued)

FOREIGN PATENT DOCUMENTS

| JP | 08-137611 A | 5/1996 |
| JP | H09-35083 A | 2/1997 |

(Continued)

OTHER PUBLICATIONS

Japanese Office Action dated Jul. 25, 2014, issued in corresponding Japanese Patent Application No. 2010-258298.

*Primary Examiner* — Daniel Hajnik
(74) *Attorney, Agent, or Firm* — Fitzpatrick, Cella, Harper & Scinto

(57) ABSTRACT

An apparatus designs an animation expressing a transition of display forms of an object. A reception unit receives an operation for setting key frames in the animation at one or more time points on a time axis displayed on a screen, the time axis corresponding to the animation, and instructs a display form of the object at each of the set key frames. The reception unit receives, in a state when one or more key frames are set on the time axis and a display form of the object is instructed at each of the set key frames, an instruction for reflecting a display form of the object instructed to a first key frame of an already set one or more key frames as a display form of the object at a second key frame set on the time axis. A display control unit displays indicators representing the key frames.

21 Claims, 13 Drawing Sheets

(56) References Cited

U.S. PATENT DOCUMENTS

| | | | |
|---|---|---|---|
| 2003/0146915 A1* | 8/2003 | Brook et al. | 345/473 |
| 2005/0041029 A1* | 2/2005 | Felt | 345/473 |
| 2005/0050156 A1 | 3/2005 | Suzuki et al. | 709/217 |
| 2005/0071769 A1 | 3/2005 | Suzuki et al. | 715/762 |
| 2006/0041171 A1 | 2/2006 | Jasra et al. | |
| 2007/0182740 A1 | 8/2007 | Konami et al. | |
| 2008/0313570 A1 | 12/2008 | Shamma et al. | |

FOREIGN PATENT DOCUMENTS

| | | |
|---|---|---|
| JP | 2004-102498 A | 4/2004 |
| JP | 2004-102500 A | 4/2004 |
| JP | 2005-165445 A | 6/2005 |
| JP | 2005-301995 A | 10/2005 |
| JP | 3755500 | 1/2006 |
| JP | 3760904 | 1/2006 |
| JP | 2007-049739 A | 2/2007 |
| JP | 2007-183737 A | 7/2007 |

* cited by examiner

FIG. 7A

```
┌─701
│ <?xml version="1.0" encoding="UTF-8"?>
│ <Animation>
│     <artworks>         ─── 705
│         <artwork id="state_1" src="s1. svg"/>
│         <artwork id="state_2" src="s2. svg"/>
│         <artwork id="state_3" src="s3. svg"/>
│     </artworks>
│     <storyboards>  ─── 702
│         <timeline name="Push"> ─── 703
│             <frame time="0.0" ref="state_1"/>
│             <frame time="0.4" ref="state_2"/>
│             <frame time="0.7" ref="state_3"/>
│             <frame time="1.1" ref="state_2"/>
│         </timeline>          )
│     </storyboards>          704
│ </Animation>
```

FIG. 7B

```
┌─751
│ <?xml version="1.0" encoding="UTF-8"?>
│ <svg width="120" heigth="130" zoomAndPan="disable"
│      viewBox="-60 -65 120 130" stroke-miterlimit="2"
│      xmlns="http://www.w3.org/2000/svg"
│      xmlns : xlink="http://www.w3.org/1999/xlink"
│      xml : space="preserve" version="1.1">
│
│     <ellipse cx="-5.49" cy="-10.99"
│         rx="41.5" ry="20" fill-opacity="0"
│         stroke="#000" stroke-linejoin="bevel"
│         stroke-miterlimit="4"/>
│     <text x="-27" y="0" font-size="30"
│         font-family="Arial">OK</text>
│
│ </svg>
```

INTER-COLOR SIMILARITY TABLE

|  | BLUE | ORANGE | GREEN |
|---|---|---|---|
| BLUE | 1 | 0 | 0.8 |
| ORANGE | 0 | 1 | 0.5 |
| GREEN | 0.8 | 0.5 | 1 |

INFORMATION PROCESSING APPARATUS, INFORMATION PROCESSING METHOD, AND STORAGE MEDIUM

BACKGROUND OF THE INVENTION

1. Field of the Invention

The present invention relates to an information processing apparatus, information processing method, and storage medium for designing an animation in a user interface.

2. Description of the Related Art

Many recent devices and Web applications employ a GUI (Graphic User Interface) that uses animation.

On the other hand, the employment of animations increases the manhours involved in GUI development. This is because the development target, which has conventionally been a GUI formed from just a "still image", needs to include the new concept of "motion". Recently known GUI animation design techniques are, for example, Japanese Patent Laid-Open Nos. 08-137611 and 2004-102500, Japanese Patent No. 03755500, Japanese Patent Laid-Open No. 2004-102498, and Japanese Patent No. 03760904. There are also commercially available products such as Expression Blend of Microsoft, FLASH Catalyst of Adobe, and Mobile Designer of Beatware.

These prior arts generally design an animation based on the concepts of "time line" and "frame". "Time line" is a time axis for animation design. A GUI developer sets feature time points called frames (key frames) on the time axis (on the time line) in a design screen, and then defines an artwork (a still image of GUI associated with the key frame and representing the display form of an object of the animation) for each frame (for each feature time point). The thus generated design data is interpreted by a device that executes the GUI so that images are generated to interpolate images between time points on which the artworks of frames are set. FIG. 3 illustrates an example of an animation design tool 301. This tool includes an artwork edit panel 302 and a time line edit panel 304. The GUI developer first arranges frames 305 and 306 on the time line edit panel 304, and edits artworks corresponding to the frames. For example, the GUI developer selects the arranged frame 305, and edits an artwork 308 corresponding to that frame on the artwork edit panel 302. At this time, it is also possible to select a graphic element from a graphic element palette 303 and arrange it on the edit panel 302. In addition, the edited animation can be confirmed using an animation play button 307.

For example, assume that five frames A, B, C, D, and E are arranged on the time line, as shown in FIG. 4A, and five artworks V, W, X, Y, and Z are defined for the frames, respectively, as shown in FIG. 4B. Then, an animation as shown in FIG. 4C is generated by interpolating the artworks. In the example shown in FIGS. 4A to 4C, the animation shows an elliptical artwork with a text "OK", which gradually changes its color and size and returns to the original form in 1.4 sec.

It is possible to correct the animation by changing the position of each frame on the time line. For example, when the frame C is moved toward the frame D, the artwork W slowly changes to the artwork X, and the artwork X quickly changes to the artwork Y.

This animation design scheme using the time line and frames requires an artwork for each frame to be created and defined. For example, assume that the frames B and D of the example in FIGS. 4A to 4C should use the same artwork. Even in this case, however, it is necessary to create the identical artworks W and Y as artworks corresponding to the frames B and D.

The restriction of defining a different artwork for each frame increases the burden on the GUI developer. In addition, since a plurality of data needs to be stored for completely identical artworks, the size of created animation data becomes large.

SUMMARY OF THE INVENTION

The present invention has been made in consideration of the above-described problems, and provides an information processing apparatus capable of selecting an artwork corresponding to a frame from existing artworks. The present invention also provides an information processing apparatus capable of manipulating a plurality of frames that share an artwork in synchronism with each other.

According to one aspect of the present invention, there is provided an information processing apparatus for setting key frames at a plurality of time points on a time axis, and based on information representing a display form of an object of each of the key frames, designing an animation including the objects, comprising: a storage unit adapted to store information that associates information representing the key frame with information representing the display form of the object of the key frame; an assignment unit adapted to assign, to the time points corresponding to the key frames, indicators with which a difference between the display forms of the objects of the key frames is identifiable; and a control unit adapted to, when a new key frame is set at a time point of interest on the time axis where no key frame is preset, and the same indicator as one of the indicators is assigned to the time point of interest, cause the storage unit to store information representing the newly set key frame in association with information representing the display form of the object of each preset key frame, which is information representing the display form of the object of the key frame at the time point to which the same indicator is assigned.

Further features of the present invention will be apparent from the following description of exemplary embodiments with reference to the attached drawings.

BRIEF DESCRIPTION OF THE DRAWINGS

FIG. 7A is a view showing an example of an animation information storage file according to the first embodiment;

FIG. 7B is a view showing an example of an artwork information storage file according to the first embodiment;

FIG. 11 is a view showing an example of an inter-color similarity table according to the third embodiment;

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

(First Embodiment)

Figure 3:
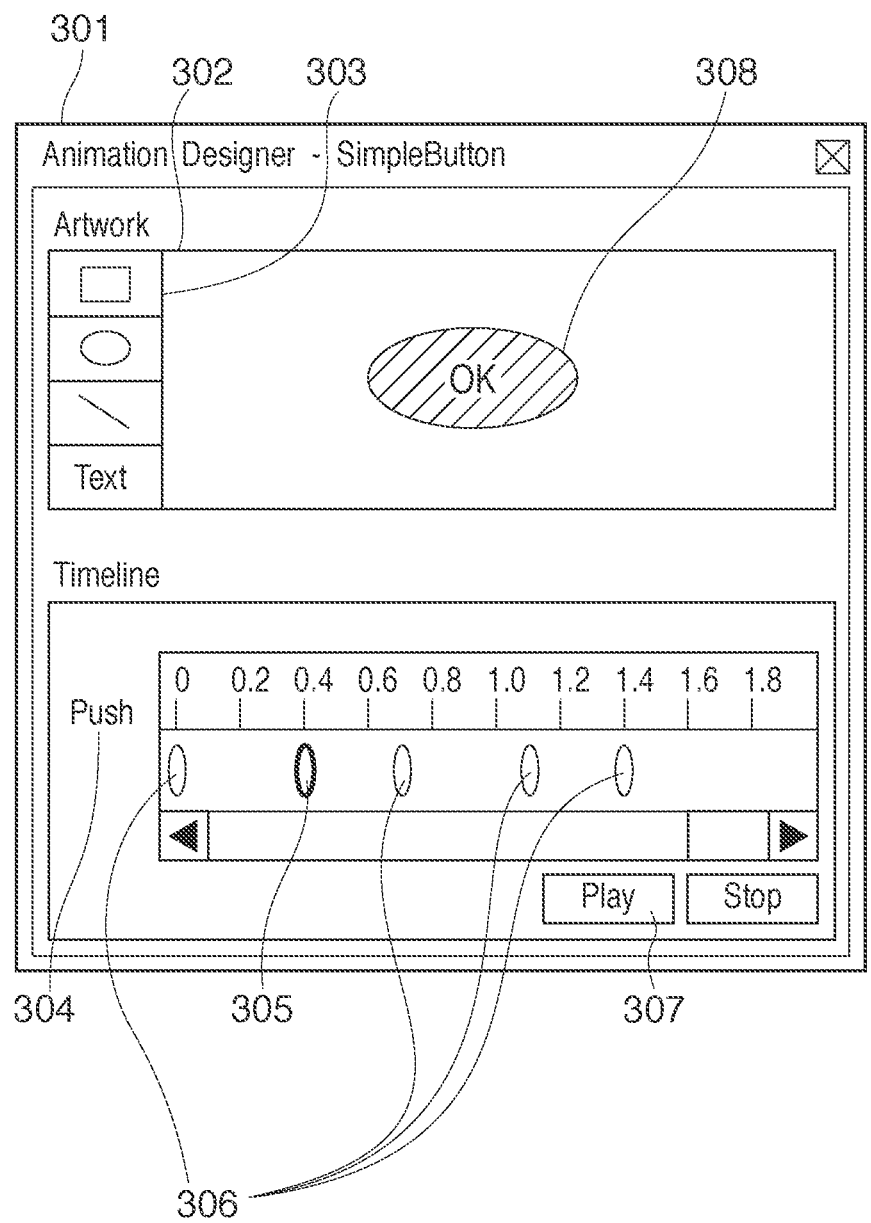
FIG. 3 is a view showing an example of a general animation design tool.
Figure 4A:
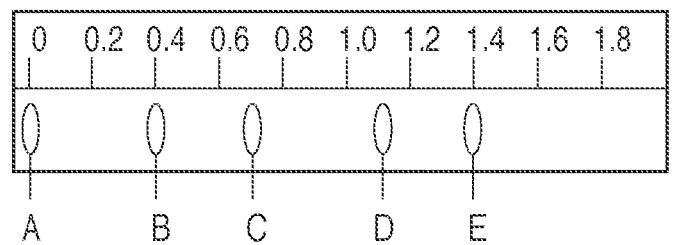
FIGS. 4A, 4B, and 4C are explanatory views of a general animation design scheme.
Figure 4B:
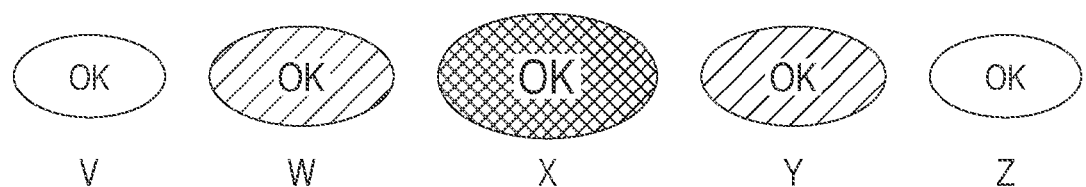
Figure 4C:
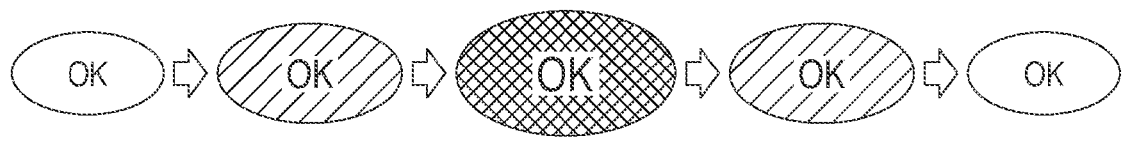

An information processing apparatus for designing an animation according to the present invention can be implemented as an application as shown in FIG. 3 on, for example, a PC (Personal Computer). An animation design apparatus designs an animation by arranging feature time points at a plurality of positions on the time axis in a design screen and defining the display form of each artwork included in the animation for each feature time point.

Figure 1:
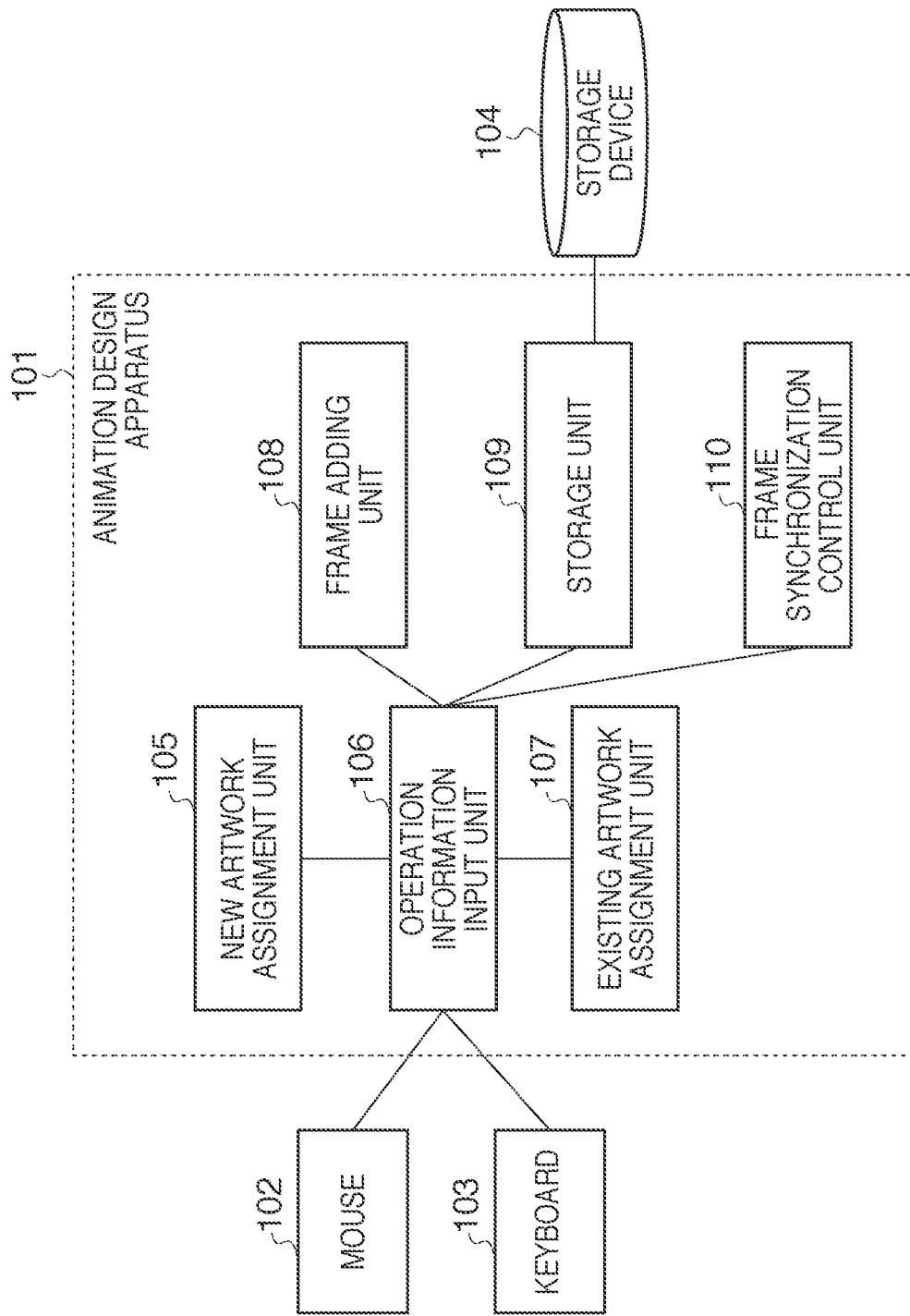
FIG. 1 is a block diagram showing the functional arrangement of an animation design apparatus.
Figure 2:
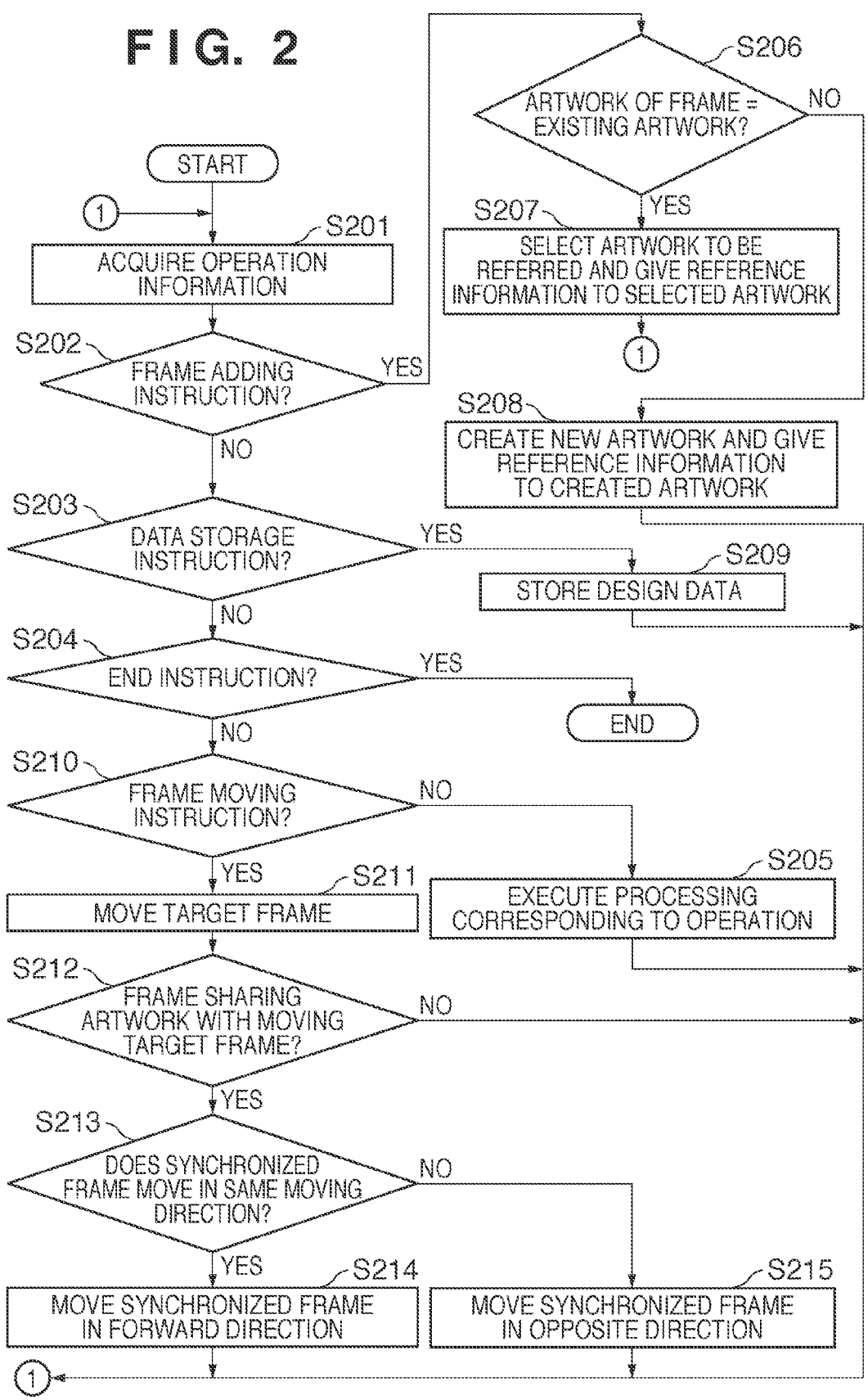
FIG. 2 is a flowchart of the animation design apparatus.

The basic operation of the animation design apparatus according to the present invention will be described with reference to FIGS. 1 and 2. FIG. 1 is a block diagram showing the functional arrangement of the animation design apparatus. FIG. 2 is a flowchart of the operation of the animation design apparatus. Devices such as a mouse 102 and a keyboard 103 operable by a GUI developer are connected to an animation design apparatus 101. A storage device 104 that stores generated design data is also connected. The animation design apparatus 101 includes a new artwork assignment unit 105, operation information input unit 106, existing artwork assignment unit 107, frame adding unit 108, storage unit 109, and frame synchronization control unit 110. The new artwork assignment unit 105 performs processing of assigning a new artwork. The operation information input unit 106 performs processing of inputting operation information by the GUI developer or the like. The existing artwork assignment unit 107 performs processing of assigning an existing artwork. The frame adding unit 108 performs processing of adding a frame. The storage unit 109 performs processing of storing animation design data (for example, information of feature time points on the time axis and information of artworks of an animation associated with the feature time points). The frame synchronization control unit 110 performs processing of synchronizing frames that share an artwork.

In step S201, operation information input from a device such as a mouse or a keyboard is input into the animation design apparatus 101 via the operation information input unit 106 functioning as an acquisition unit. The operation of the animation design apparatus 101 changes in accordance with the contents of the input operation information.

Figure 5:
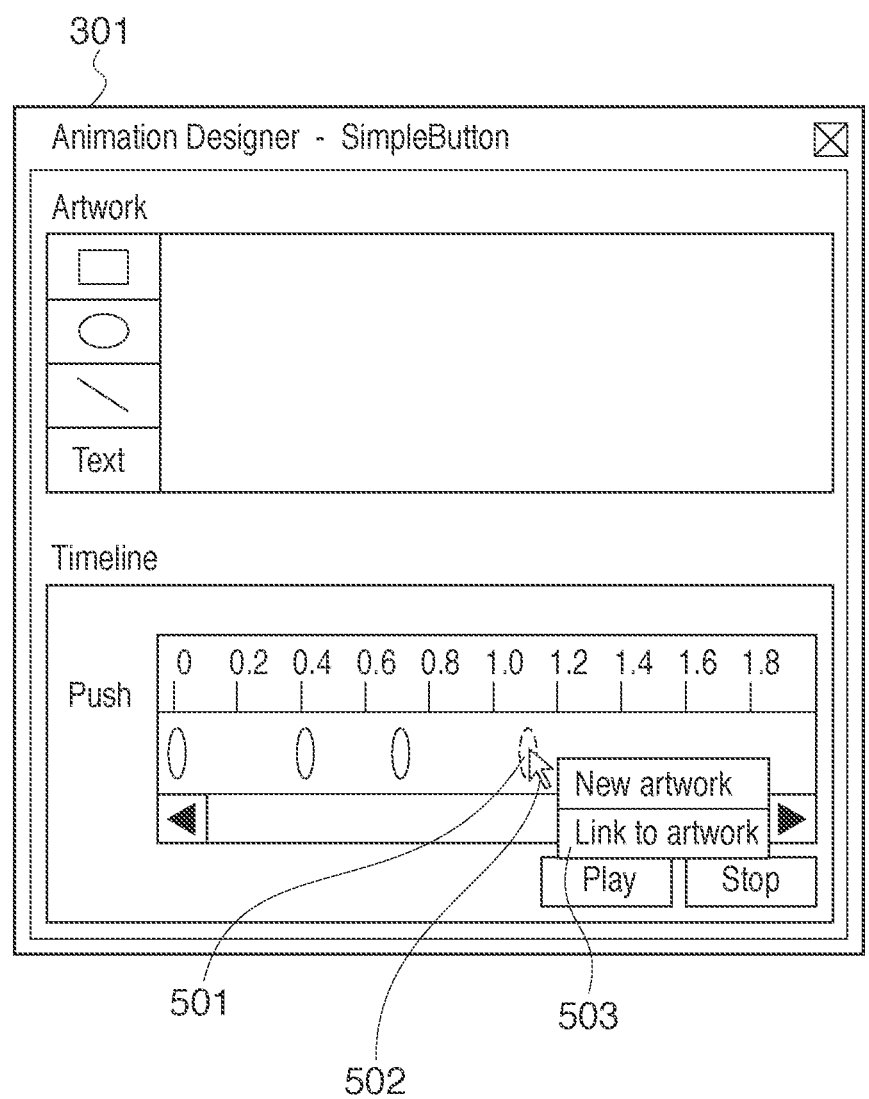
FIG. 5 is a view showing an example of a frame adding scheme according to the first embodiment.

More specifically, in step S202, the operation information input unit 106 functioning as a first determination unit determines whether the operation information is a frame adding instruction. For example, placing a mouse pointer 502 at a specific position on the time line, as shown in FIG. 5, and clicking the right button of the mouse may be regarded as a frame adding instruction. If a frame adding instruction is input (YES in step S202), the process advances to step S206. In step S206, the information is sent to the frame adding unit 108 so as to add new frame information (add a feature time point) onto the time line. Next, the operation information input unit 106 functioning as a second determination unit determines based on the operation information whether the artwork corresponding to the frame is an existing one. For example, as shown in FIG. 5, a newly inserted frame 501 is displayed on the time line in accordance with the frame adding instruction. Then, a context menu 503 may be displayed to cause the user to select a new artwork or an existing artwork as an artwork to be associated.

If the GUI developer selects an instruction to associate a new artwork with the frame (NO in step S206), the information is sent to the new artwork assignment unit 105. In step S208, the new artwork assignment unit 105 functioning as a first setting unit creates a new artwork, and gives reference information from the frame added this time to the newly created artwork. New artwork creation can be done by the GUI developer using an artwork edit panel 302. At this time, an empty artwork may be presented as a default artwork (an artwork to be presented first time). Alternatively, an artwork associated with the frame immediately before the frame added this time on the time line may be copied and presented.

Figure 6A:
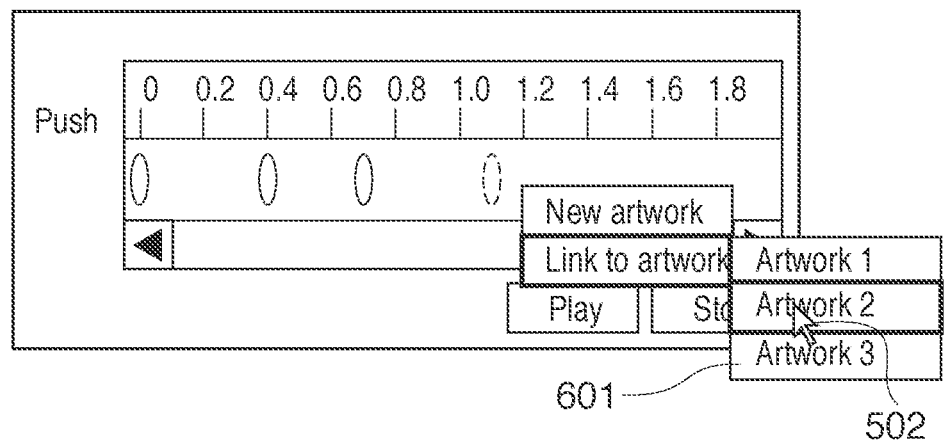
FIGS. 6A and 6B are views showing an example of referring to existing artworks according to the first embodiment.

On the other hand, if the GUI developer selects an instruction to give the frame reference information to an existing artwork (YES in step S206), the information is sent to the existing artwork assignment unit 107. In step S207, the existing artwork assignment unit 107 functioning as a second setting unit causes the GUI developer to select an existing artwork reference to which should be given to the frame added this time. Processing of making the newly added frame refer to the selected existing artwork is performed. For example, when reference to an existing artwork (Link to artwork) is selected from the context menu 503, an exiting artwork list 601 is presented, as shown in FIG. 6A, so as to allow the GUI developer to select one of the existing artworks using the mouse pointer 502. For example, when the GUI developer selects "Artwork 2", reference information to "Artwork 2" that is an existing artwork is given to the newly added frame.

Figure 6B:
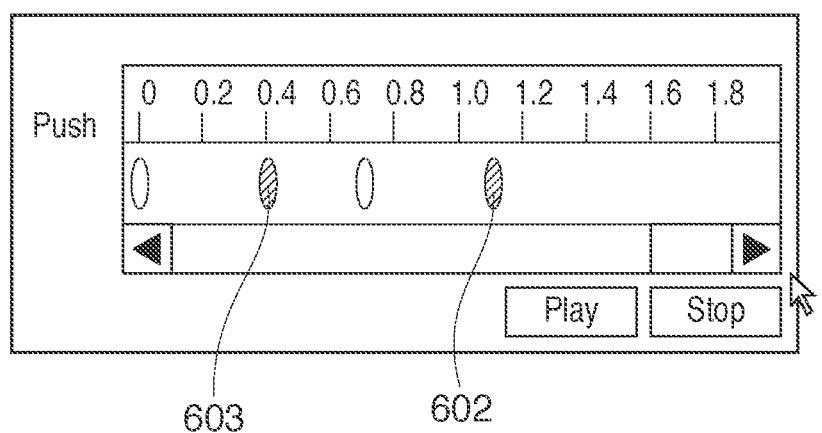

FIG. 6B shows an example of a time line edit panel 304 after the above-described series of operations has been performed. At this time, the identification indicator (for example, color or shape) of each frame that shares an artwork with another frame may be changed. For example, assume that a frame 603 at a position "0.4 sec" and a frame 602 added this time refer to the same "Artwork 2". In this case, these frames are expressed by an identification indicator different from that of the remaining frames. This is because GUI developer's changing the shared artwork may affect a plurality of frames and lead to generation of an unexpected animation. Thus changing the identification indicators of frames that refer to a shared artwork from those of remaining frames enables to call the GUI developer's attention.

On the other hand, upon determining in step S202 that no frame adding instruction is input, the process advances to step S203. In step S203, if the operation information input from the operation information input unit 106 to the apparatus is a design data storage instruction (YES in step S203), the information is sent to the storage unit 109. For example, pressing the save button on the application can be regarded as a data storage instruction. In step S209, the storage unit 109 stores, in the storage device 104, design data and the like designed by the animation design apparatus 101. For example, an animation information storage file 701 shown in FIG. 7A and an artwork information storage file 751 shown in FIG. 7B can be regarded as design data.

The animation information storage file 701 is a file of XML format that describes the position of each frame on the time line and the association between frames and artwork. This file has an element expressing time line information 702, and frame information 703 as its sub elements. Each frame information has time information on the time line and link information 704 to artwork information. Artwork information 705 is separately defined, in which the ID of an artwork and the actual artwork information storage file name are described. Note that in this example, the frame placed at time="1.1" and the frame placed at time="0.4" share an artwork of id="state_2". It is therefore possible to decrease the number of artwork elements which needs originally be as many as the frame elements (and also the number of *.svg files referred to from artwork elements).

The artwork information storage file 751 shown in FIG. 7B expresses a specific artwork and can use a standard image format. For example, SVG of W3C may be used as the artwork information storage file. The artwork information storage file 751 is an example of the artwork information storage file described in SVG.

Note that the expression form of the design data described here is merely an example, and the present invention is not limited to this form. A file described in XHTML or SMIL may be used as the animation information storage file or artwork information storage file. Alternatively, an artwork may be expressed using a binary format such as Bitmap, PNG, or Jpeg.

In step S203, if the operation information input from the operation information input unit 106 to the animation design apparatus 101 is not a data storage instruction (NO in step S203), the process advances to step S204. In step S204, if the operation information input from the operation information input unit 106 to the animation design apparatus 101 is an end instruction (YES in step S204), the procedure shown in FIG. 2 ends, and the animation design apparatus 101 finishes the operation. For example, pressing the end button on the application can be regarded as an end instruction.

On the other hand, if the operation information input from the operation information input unit 106 to the animation design apparatus 101 is none of the frame adding instruction, data storage instruction (save instruction), and end instruction (NO in step S204), the process advances to step S210. In step S210, if the operation information input from the operation information input unit 106 to the apparatus is an instruction to move a target frame on the time line (YES in step S210), the information is sent to the frame synchronization control unit 110. The target frame is moved to the position after movement (step S211). The data in the animation design apparatus is thus rewritten and stored in the storage device based on the next data storage instruction.

Figure 12A:
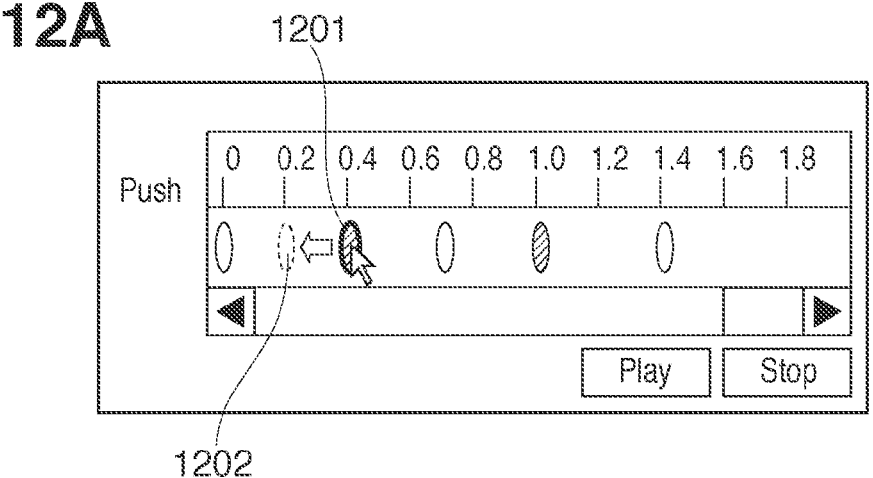
FIGS. 12A, 12B, and 12C are views showing examples of a time line edit panel according to the first embodiment.

An example of the frame moving operation is dragging a frame on the time line using the mouse. This corresponds to an operation of changing the display time of a specific artwork to another time. For example, in FIG. 12A, a moving target frame 1201 is moved to a position 1202 after movement on the time line.

Then, it is determined whether the moving target frame and another frame share an artwork (step S212). For example, the association between frames and artworks on the memory of the device is checked. It is determined whether a frame associated with the same artwork as that associated with the moving target frame exists. If the moving target frame shares an artwork with another frame (YES in step S212), it is determined whether to move the frame in the same direction as that of the moving processing executed by the GUI developer (step S213). This can be implemented by accessing the internal memory of the animation design apparatus and referring to the flag representing the frame moving direction, that is, the same direction or opposite direction. The flag can be set in advance by the GUI developer via, for example, the setting screen of the animation design apparatus. Alternatively, the moving direction of the frame sharing the artwork may be determined in accordance with the GUI developer's operation upon moving the moving target frame. For example, control can be performed such that when the GUI developer has moved the frame while pressing the control key of the keyboard, the frame sharing the artwork is moved in the opposite direction. When the GUI developer has moved the frame without pressing the key of the keyboard, the frame sharing the artwork is moved in the same direction.

Figure 12B:
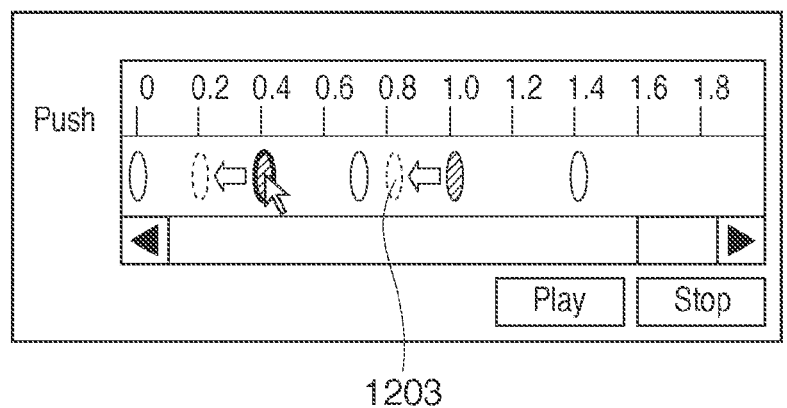

Assume here that it is determined that the moving target frame and the frame sharing the artwork synchronously move in the same direction (YES in step S213). In this case, the frame sharing the artwork is moved in the same direction as the moving direction of the moving target frame (step S214). The moving amount may be the same. FIG. 12B shows an example of the GUI of the animation design apparatus at this time. When the user moves a specific frame by the mouse or the like, the frame sharing the artwork also synchronously moves in the same direction to a position 1203 by the same moving amount.

Figure 12C:
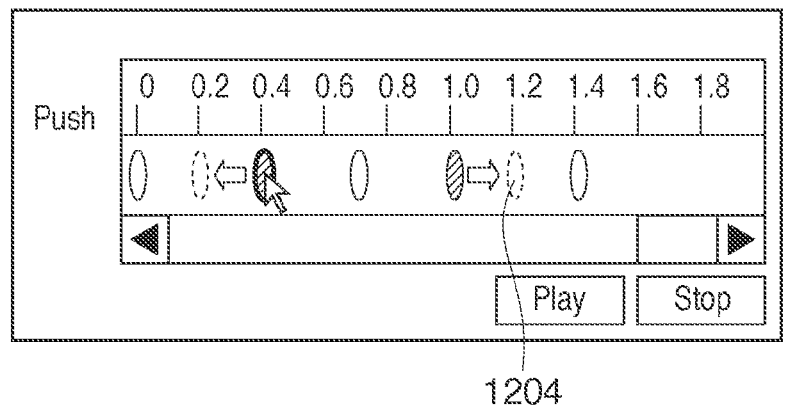

On the other hand, assume that it is not determined that the moving target frame and the frame sharing the artwork synchronously move in the same direction (NO in step S213). In this case, the frame sharing the artwork is moved in the direction opposite to the moving direction of the moving target frame (step S215). The moving amount may be the same. FIG. 12C shows an example of the GUI of the animation design apparatus at this time. When the user moves a specific frame by the mouse or the like, the frame sharing the artwork also synchronously moves in the opposite direction to a position 1204 by the same moving amount.

Figure 15A:
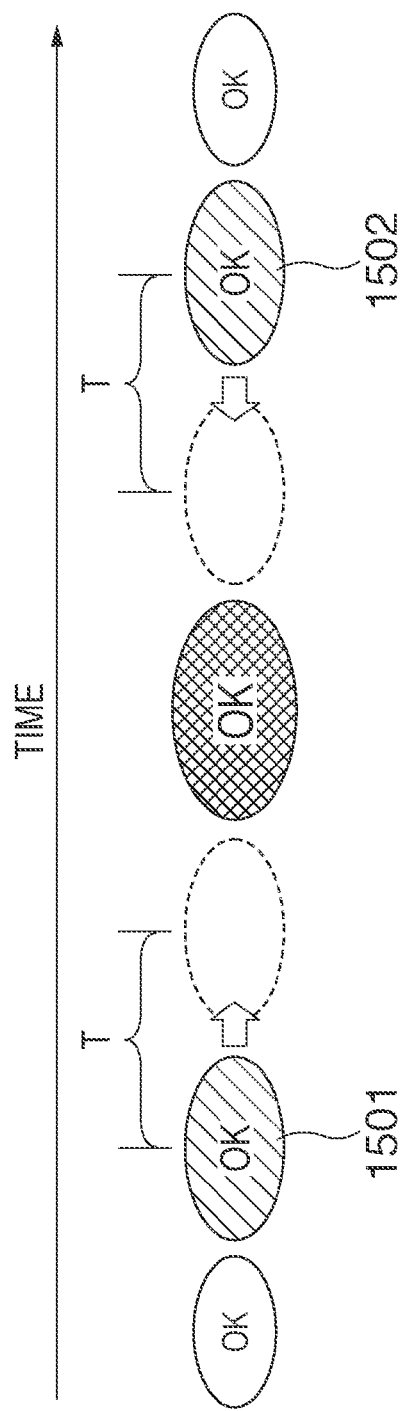
FIGS. 15A and 15B are explanatory views of an animation according to the first embodiment.
Figure 15B:
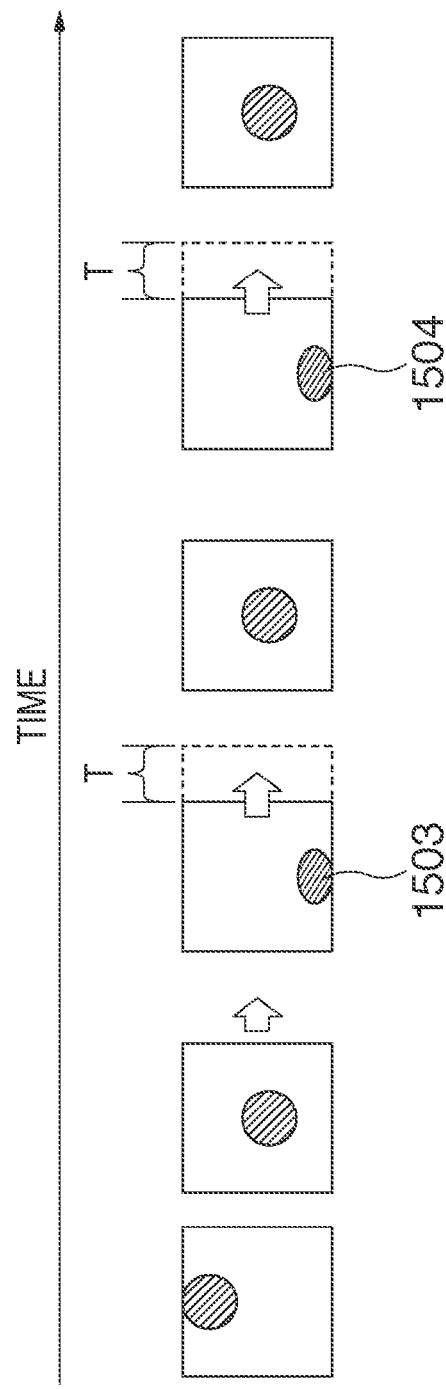

FIGS. 15A and 15B show an example of an animation designed using the frame synchronization function. FIG. 15A illustrates an example in which the frame sharing the artwork is moved in the opposite direction. When the frame associated with an artwork 1501 on the time line is moved backward by a time T, a frame 1502 that shares the artwork can also be moved forward by the time T. When the frame sharing the artwork moves in the opposite direction, the symmetry with respect to the center of the time line is maintained. For this reason, this method is suitable for designing an animation characterized by temporarily deforming to another shape and then returning to the original shape.

FIG. 15B illustrates an example in which the frame sharing the artwork is moved in the same direction. When the frame associated with an artwork 1503 on the time line is moved backward by the time T, a frame 1504 that shares the artwork can also be moved backward by the time T. When the frame sharing the artwork moves in the same direction, the time between the frames is maintained. For this reason, this method is suitable for designing an animation characterized by temporarily deforming to another shape and then returning to the original shape in the same time (as that before movement).

If the operation information input from the operation information input unit 106 to the animation design apparatus 101 is none of the frame adding instruction, data storage instruction (save instruction), end instruction, and frame moving instruction (NO in step S210), the process advances to step S205. In step S205, processing corresponding to the operation is executed. For example, for an edit instruction to change the color of a specific graphic element on an artwork, processing according to the instruction is executed. Even for an instruction to drag a frame to change its position, processing according to it can be performed. Pressing an animation play button 307 allows to activate an animation playback apparatus to be described below so as to preview the created animation.

Figure 8A:
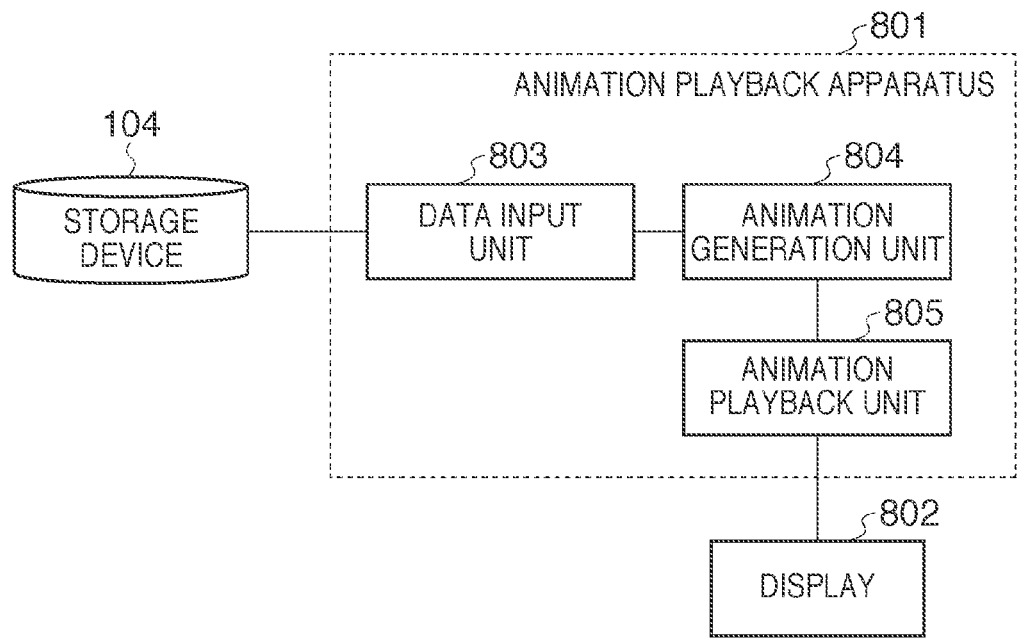
FIG. 8A is a block diagram showing the functional arrangement of an animation playback apparatus.

The functional arrangement of an animation playback apparatus 801 will be described with reference to FIG. 8A. The animation playback apparatus 801 loads design data (the animation information storage file 701 and the artwork information storage file 751) from the storage device 104 via a data input unit 803. The loaded design data is sent to an animation generation unit 804 to generate an animation that interpolates between artworks. This method can use a known technique such as MotionTween or ShapeTween, and a description thereof will be omitted here. The generated animation is sent to an animation playback unit 805, and output via a display 802. The animation playback apparatus 801 may be implemented either on the same application as that of the animation design apparatus 101 or as another application. The animation playback apparatus 801 can also be an animation presentation application that is implemented on an embedded device such as a music player or a cellular phone.

Figure 8B:
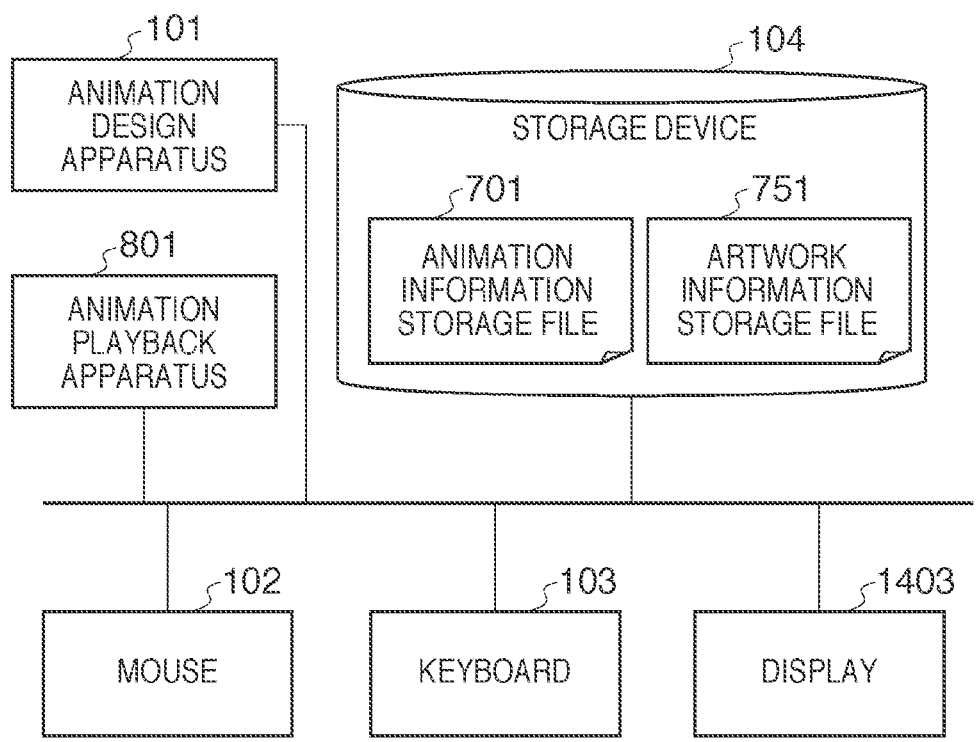
FIG. 8B is a system diagram showing the association between the animation design apparatus and the animation playback apparatus.

FIG. 8B is a system diagram of the above-described apparatuses. Note that the same reference numerals as in the above-described drawings denote the same parts. The animation playback apparatus 801 can use design data on the storage device 104 created by the animation design apparatus 101.

Using the animation design apparatus according to the embodiment yields the following effects. When assigning artworks to frames, not only new artwork creation but also existing artwork assignment is possible. This makes it possible to reduce the manhours of GUI developer's artwork creation and the size of design data. When frames sharing an artwork are expressed by an identification indicator that is different from those of the remaining frames, the GUI developer can be aware of the artwork sharing state. This allows to call the GUI developer's attention to a fact that artwork edit of a frame will affect another frame. When one of a plurality of frames sharing an artwork is moved on the time line, the generated animation often loses consistency unless the remaining frames sharing the artwork are carefully moved. In the animation design apparatus of this embodiment, however, since the design apparatus guarantees the synchronization, the design manhour of the GUI developer shortens.

(Second Embodiment)

In the first embodiment, the identification indicators of frames sharing an artwork are changed to make the GUI developer aware of the artwork sharing state. In this method, however, since the outer appearances (indicators) of the frames sharing the artwork are uniformly changed, it may be difficult to determine which frame shares the artwork.

Figure 9:
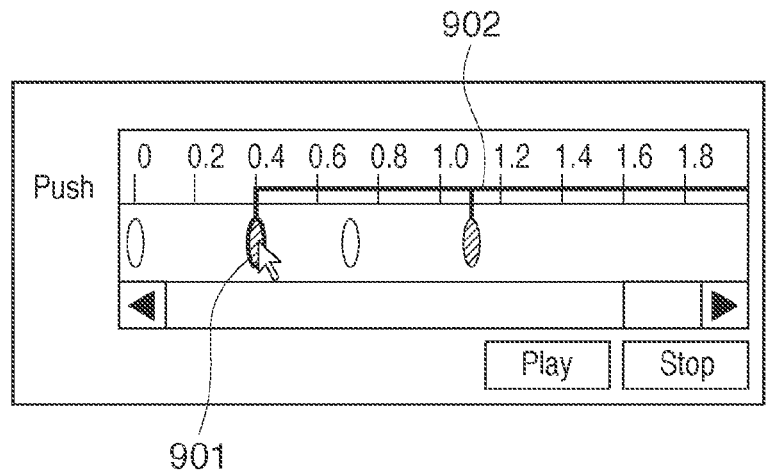
FIG. 9 is a view showing an example of a time line edit panel according to the second embodiment.

An example of a time line edit panel that solves the above-described problem will be described with reference to FIG. 9. The identification indicators of usual frames are not changed. When the GUI developer selects a frame, its outer appearance (indicator) is changed. For example, when the storage device selects a frame 901, only the identification indicator (for example, color or shape) of each frame that shares the artwork with the frame 901 is changed. In addition, these frames may be connected by a line 902 or the like (the identification indicators at the feature time points may be connected by a line) to make the GUI developer more clearly aware of the shared relationship.

Only changing the identification indicators of frames does not suffice for determining whether they share the artwork with frames outside the screen. If the frames share the artwork with frames outside the screen, the GUI developer can be notified of the presence of frames sharing the artwork by extending the line 902 to outside the screen, as shown in FIG. 9.

Using the animation design apparatus according to the embodiment yields the following effects. When there are a plurality of feature time points having the same outer appearance (indicator), the identification indicators of frames sharing an artwork are changed only when they are selected. This allows only a specific sharing relationship to be confirmed. The GUI developer can also be aware of the sharing relationship of frames that are not displayed on the screen.

(Third Embodiment)

Figure 10A:
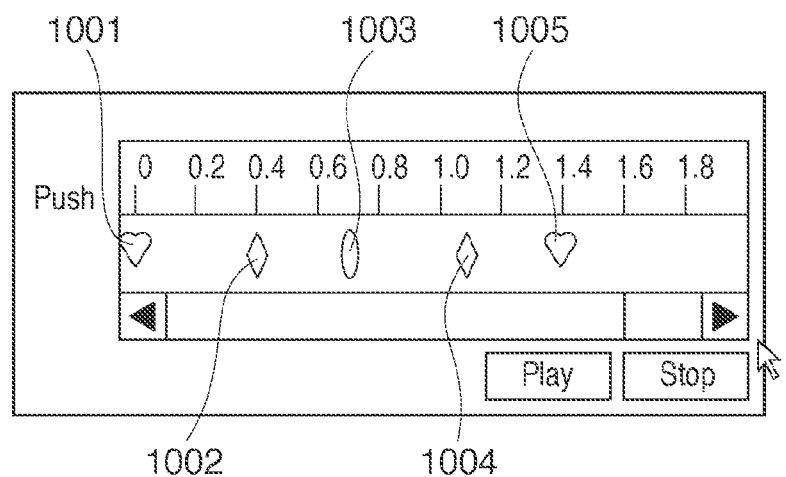
FIGS. 10A and 10B are views showing examples of a time line edit panel according to the third embodiment.

In the third embodiment, an example will be described in which the identification indicators of frames sharing artworks are changed. FIG. 10A shows an example in which the frame identification indicators are changed for each referred artwork. Assume that frames 1001 and 1005 refer to the same artwork, frames 1002 and 1004 refer to the same artwork, and a frame 1003 does not share the artwork with other frames.

When the GUI developer inputs an instruction to share the artworks of frames, an animation design apparatus 101 changes the identification indicators of all frames sharing the artworks to those different from the default indicator. For example, an icon in a shape that is not appearing on the time line is selected and set as the identification indicator of a frame. In this way, for example, the identification indicators of the frames 1002 and 1004 on the time line are changed to a rhombus, and the outer appearances (indicators) of the frames 1001 and 1005 are set to a heat shape. At this time, not only the shape but also the color may be changed to a unique one on the time line.

Figure 10B:
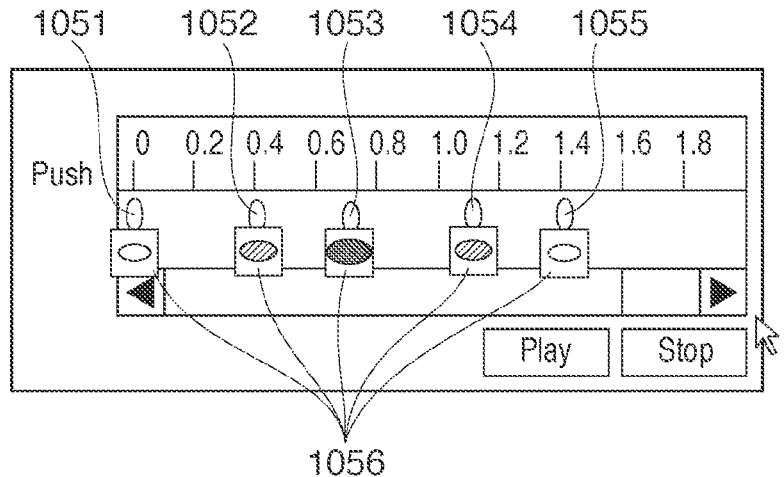

FIG. 10B shows an example in which the thumbnail images of artworks corresponding to frames are added instead of changing the frame identification indicators themselves. Frames 1051 to 1055 are given thumbnails 1056 of artworks associated with the frames. This scheme is advantageous in easily understanding the change in the outer appearances of artworks only by seeing the time line. In addition, changing the frame color to a unique one for each shared artwork also enables to understand the artwork sharing relationship.

As described above, assigning a different color to the identification indicators of frames that share an artwork can effectively make the GUI developer aware of the artwork sharing relationship. How to assign colors will be explained here.

When assigning colors to frames, the animation design apparatus 101 according to the embodiment can use an inter-color similarity table 1101 as shown in FIG. 11. More specifically, a color whose degree of similarity is high concerning the color most contained in the artwork and low concerning the colors of the left and right frames is selected. For example, using the following evaluation expression, a color having the highest score is selected as the frame color.

(Score of color A)=(degree of similarity between color A and color most contained in artwork)−(degree of similarity between color A and color of left frame)−(degree of similarity between color A and color of right frame)

For example, assume that the color most contained in the artwork is blue, and the colors of the left and right frames are orange. In this case, when the above evaluation expression is used, Score of blue=1−0−0=1

Score of orange=0−1−1=−2

Score of green=0.8−0.5−0.5=−0.2

It is possible to select blue with the highest score and set as the frame color. Note that the expression and the inter-color similarity table are merely examples, and any other expression and table can also be used. The shapes assigned to the frames may be changed in accordance with the intervals to the left and right frames (the distances between the feature time points on the time axis). For example, if a new frame is inserted between left and right frames that are close to each other, a frame in a shape as narrow as possible is assigned. This improves the visibility without frame overlap. To implement this, the necessary display widths of assignable frame shapes are stored as a display width information table. When changing the identification indicator of a frame, a frame shape is selected from the shapes that can fit between the left and right frames and assigned by referring to the table.

Using the animation design apparatus 101 according to the embodiment yields the following effects. It is possible to set a different identification indicator (for example, color or shape) for frames sharing each artwork. The indicator can be changed to an identification indicator considering the thumbnail image of the artwork or the color most contained in the artwork. This allows to recall the artwork only by seeing the frame. It is also possible to change the identification indicator of a frame in consideration of the colors or arrangement interval of left and right frames on the time line. This enables to avoid frame overlap on the time line, and improves the visibility.

(Fourth Embodiment)

In the fourth embodiment, an operation of reassigning an identification indicator (for example, color or shape) when a frame sharing an artwork is moved on the time line will be described. For example, assume that a frame moving instruction is input by the mouse or the like, and a frame assigned red is moved to a region between orange frames (movement of the identification indicator of a feature time point). In this case, the frame array after the movement is orange, red, and orange. Since the degree of similarity is high, it is difficult to distinguish the feature time point from those in the vicinity, resulting in poorer visibility. To prevent this, when a frame is moved over another frame, the identification indicator (for example, color or shape) of the frame of the moving destination may be reassigned. For example, the scheme described in the third embodiment may be used to assign a color.

Using an animation design apparatus 101 according to the embodiment yields the following effect. When the GUI developer moves a frame, the visibility is maintained even at the moving destination because the identification indicator of the feature time point is reassigned.

(Fifth Embodiment)

Figure 13:
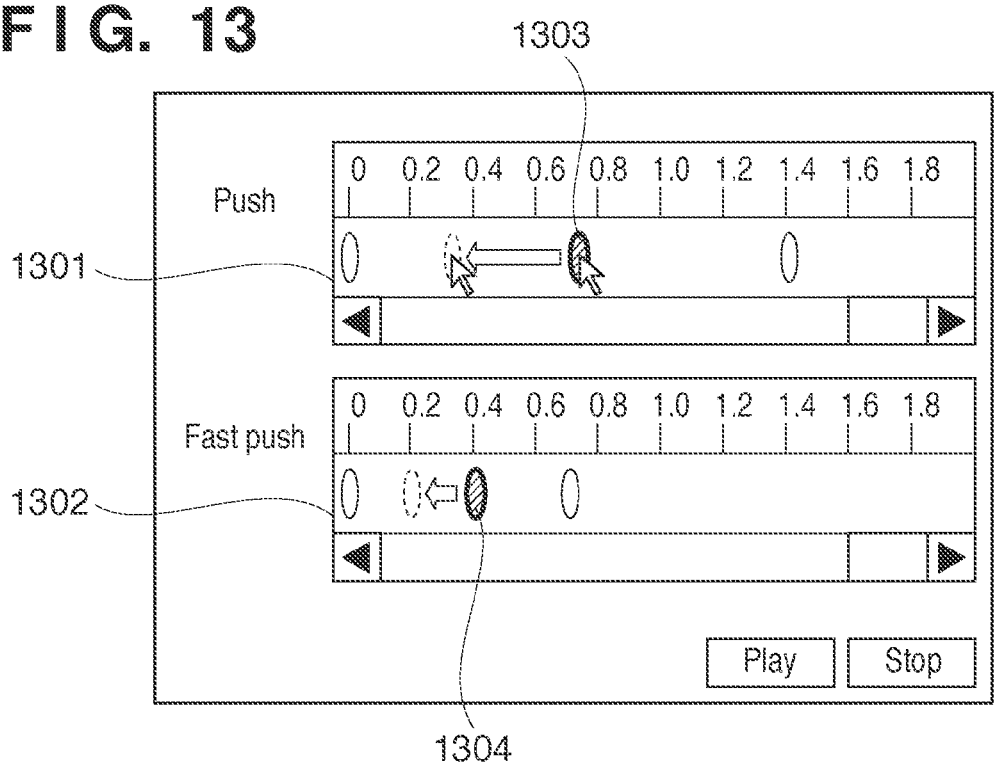
FIG. 13 is a view showing an example of a time line edit panel according to the fifth embodiment.

In the fifth embodiment, an operation of changing the moving amount of a frame to be synchronized when a frame sharing an artwork is moved on the time line will be described. FIG. 13 shows an example of an animation design tool that is editing different animations "Push" and "Fast push". "Push" is an animation when the GUI button is pressed at a normal speed. "Fast push" is an animation when the GUI button is pressed at a speed higher than the normal speed. When designing animations to be displayed at different speeds but using the same artworks, it is preferable to cause the frames to share different artworks on the time line in terms of design efficiency.

Assume that the GUI developer moves, for example, a frame 1303 on the time line by the mouse operation. If a frame 1304 is the frame sharing the artwork, the frame 1304 can be synchronized according to the first embodiment. In the first embodiment, the synchronization amount at this time is the same as the moving amount of the frame 1303. However, a value obtained by multiplying the moving amount by a predetermined constant may be set as the moving amount of the frame 1304.

For example, when animating "Fast push" at a speed twice that of "Push" is set in advance on the setting screen of the animation design tool, a value "½" having "2" as the denominator can be used as the constant value. Hence, if the frame 1303 is moved 0.5 sec before, synchronization can be done by moving the frame 1304 0.25 sec before, which is the product of 0.5 sec and the constant ½.

Alternatively, the constant value may be dynamically calculated based on the ratio of animation lengths instead of presetting it on the setting screen. Since the length of an animation corresponds to the position of the final frame of the animation, the length can easily be acquired.

For example, assume that the end time (final frame position) of the "Push" animation is 1.4 sec, and the end time (final frame position) of the "Fast push" animation is 0.7 sec. In this case, the frame moving constant of "Fast push" for the frame moving amount of "Push" can be defined as end time of "Fast push" animation/end time of "Push" animation, and calculated as 0.5. When the GUI developer moves the frame of "Push", the frame of "Fast push" can be synchronized by a moving amount obtained by multiplying the moving amount by 0.5.

Using an animation design apparatus 101 according to the embodiment yields the following effect. If frames sharing an artwork exist on animations with different lengths, synchronization can be done in consideration of the animation times.

(Sixth Embodiment)

Figure 14:
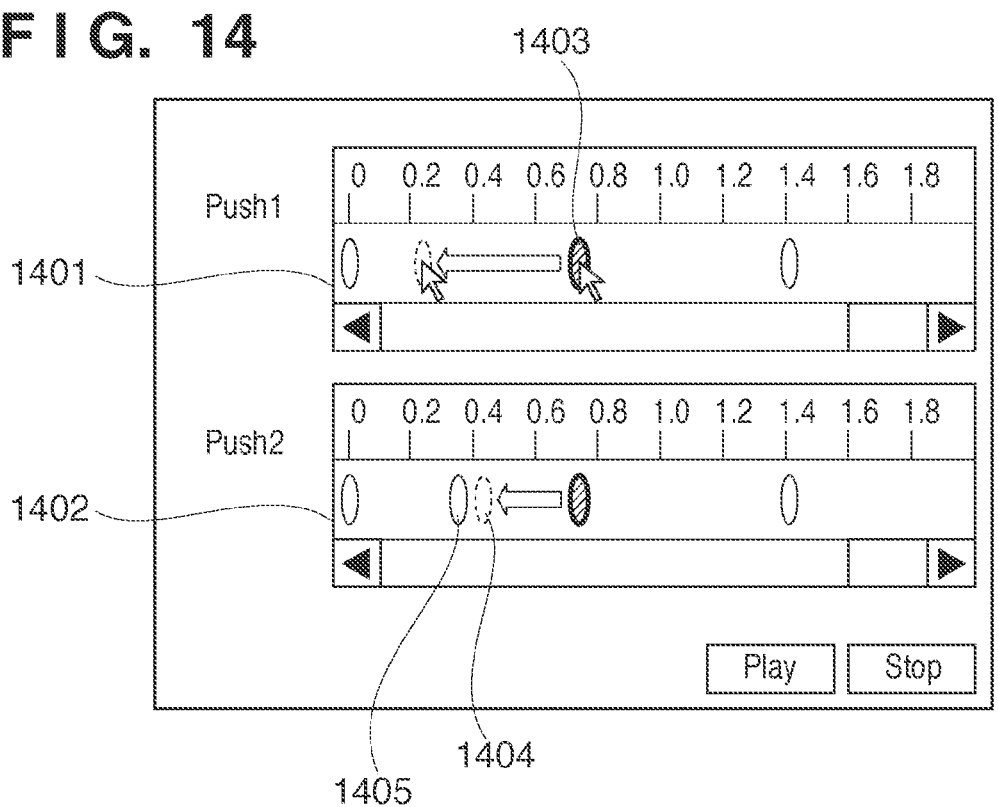
FIG. 14 is a view showing an example of a time line edit panel according to the sixth embodiment.

In the sixth embodiment, an operation of limiting movement of a frame to be synchronized when a frame sharing an artwork is moved on the time line will be described. FIG. 14 shows an example of an animation design tool that is editing different animations "Push1" and "Push2". The animations "Push1" and "Push2" are identical in general terms except that "Push2" includes an excess frame 1405.

Using the first embodiment, when a frame 1403 is moved by the mouse operation or the like, a frame 1404 sharing the artwork with the frame 1403 can be moved by the same moving amount. Using the fifth embodiment, the frame can be moved by a value obtained by multiplying the moving amount of the frame 1403 by a specific constant. However, if the frame to be synchronized moves over another frame, (the order of frames changes), the animation largely changes its appearance. For this reason, frame movement over another frame in the synchronization operation is avoided.

In this embodiment, if the synchronized frame is located on the other side of another frame 1405, the frame is moved up to immediately before the other frame. This allows to prevent the order of final frame array from changing due to the synchronization operation. If the synchronized frame is located very close to another frame, the frame may be moved while ensuring a preset interval.

Using an animation design apparatus 101 according to the embodiment yields the following effect. It is possible to prevent the order of frames from changing due to the frame synchronization function.

According to the present invention, an artwork corresponding to a frame can selected even from existing artworks. For this reason, for frames having the same artwork, the manhours of GUI developer's development and the size of animation data can be reduced.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2009-293203 filed on Dec. 24, 2009 and 2010-258298 filed Nov. 18, 2010, which are hereby incorporated by reference herein in their entirety.

What is claimed is:

1. An apparatus for designing an animation that expresses a transition of display forms of an object, said apparatus comprising:
   a reception unit adapted to receive an operation for setting key frames in the animation at one or more time points on a time axis displayed on a screen, the time axis corresponding to the animation, and for associating a display form of the object at each of the set key frames with the key frame, wherein said reception unit receives, as the operation, (i) a first instruction for associating a display form of the object that is newly defined with a key frame that is an operation target and (ii) a second instruction for assigning, to a key frame that is an operation target, reference information to a display form of the object associated with an existing key frame: and
   a display control unit adapted to display indicators representing the key frames set at the time points, at one or more time points at which the key frames have been set, on the time axis displayed on the screen, wherein said display control unit displays, in a case where the second instruction for assigning, to a second key frame that is different from a first key frame of one or more key frames that have been already set on the time axis, reference information to a display form of the object associated with the first key frame that is received by the reception unit, indicators having the same appearance, as an indicator representing the first key frame and an indicator representing the second key frame to be displayed on the time axis,
   wherein appearances of the indicator representing the first key frame and the indicator representing the second key frame are different from appearances of an indicator representing the other key frames to which a display form of the object different from a display form of the object at the first key frame and the second key frame of the already set one or more key frames is instructed.

2. The apparatus according to claim 1, wherein the second key frame is a newly added key frame in a state when one or more key frames are set on the time axis and a display form of the object at each of the set one or more key frames is instructed.

3. The apparatus according to claim 1, wherein said display control unit changes, in accordance with the second instruction that has been received by said reception unit for assigning, to the second key frame, reference information to a display form of the object instructed to the first key frame, a color of the indicators representing the first key frame and the second key frame so that the changed color is different from a color of the other indicators.

4. The apparatus according to claim 1, wherein said display control unit further provides a thumbnail image of a display form of the object associated with an indicator representing a key frame.

5. The apparatus according to claim 1, wherein said display control unit changes, in accordance with the second instruction that has been received by said reception unit for assigning, to the second key frame, reference information to a display form of the object instructed to the first key frame, the indicators representing the first key frame and the second key frame so that the changed shapes are different from shapes of the other indicators.

6. The apparatus according to claim 1, wherein said display control unit displays an indicator of a frame of which a display form of an object is shared with the set key frame, as a different indicator for each group that that have the same display form of an object, based on the assigned reference information.

7. The apparatus according to claim 1, wherein said display control unit displays indicators having the same appearance, regardless of a reference destination of the reference information, as an indicator representing a key frame to which a reference information is assigned in accordance with the second instruction, of or more keys frames disposed on the time axis.

8. A method of designing an animation that expresses a transition of display forms of an object, said method comprising:
   receiving an operation for setting key frames in the animation at one or more time points on a time axis displayed on a screen, the time axis corresponding to the animation, and for associating a display form of the object at each of the set key frames with the key frame, wherein the receiving step receives, as the operation, (i) a first instruction for associating a display form of the object that is newly defined with a key frame that is an operation target and (ii) a second instruction for assigning, to a key frame that is an operation target, reference information to a display form of the object associated with an existing key frame; and displaying indicators representing the key frames set at the time points, at one or more time points at which the key frames have been set, on the time axis displayed on the screen, wherein said displaying step displays, in a case where the second instruction for assigning, to a second key frame that is different from a first key frame of one or more key frames that have been already set on the time axis, reference information to a display form of the object associated with the first key frame that is received in the receiving step, indicators having the same appearance, as an indicator representing the first key frame and an indicator representing the second key frame to be displayed on the time axis, wherein appearances of the indicator representing the first key frame and the indicator representing the second key frame are different from appearances of an indicator representing the other key frames to which a display form of the object different from a display form of the object at the first key frame and the second key frame of the already set one or more key frames is instructed.

9. The method according to claim 8, wherein the second key frame is a newly added key frame in a state when one or more key frames are set on the time axis and a display form of the object at each of the set one or more key frames is instructed.

10. The method according to claim 8, wherein said displaying step changes, in accordance with the second instruction that has been received in said receiving step for assigning, to the second key frame, reference information to a display form of the object instructed to the first key frame, a color of the indicators representing the first key frame and the second key frame so that the changed color is different from a color of the other indicators.

11. The method according to claim 8, wherein said displaying step further provides a thumbnail image of a display form of the object associated with an indicator representing a key frame.

12. The method according to claim 8, wherein said displaying step changes, in accordance with the second instruction that has been received in said receiving step for assigning, to the second key frame, reference information to a display form of the object instructed to the first key frame, a shape of the indicators representing the first key frame and the second key frame so that the changed shapes are different from shapes of the other indicators.

13. The method according to claim 8, wherein said display step displays an indicator of a frame of which a display form of an object is shared with the set key frame, as a different indicator for each group that have the same display form of an object, based on the assigned reference information.

14. The method according to claim 8, wherein said displaying step displays indicators having the same appearance, regardless of a reference destination of the reference information, as an indicator representing a key frame to which a reference information is assigned in accordance with the second instruction, of one or more key frames disposed on the time axis.

15. A non-transitory computer readable storage medium for storing a program for executing a method of designing an animation that expresses a transition of display forms of an object, said method comprising:

receiving an operation for setting key frames in the animation at one or more time points on a time axis displayed on a screen, the time axis corresponding to the animation, and for associating a display form of the object at each of the set key frames with the key frame, wherein the receiving step receives, as the operation, (i) a first instruction for associating a display form of the object that is a newly defined with a key frame that is an operation and (ii) a second instruction for assigning, to a key frame that is an operation target, reference information to a display form of the object associated with an existing key frame; and displaying indicators representing the key frames set at the time points, at one or more time points at which the key frames have been set, on the time axis displayed on the screen, wherein said displaying step displays, in a case where the second instruction for assigning, to a second key frame that is different from a first key frame of one or more key frames that have been already set on the time axis, reference information to a display form of the object associated with the first key frame that is received in the receiving step, indicators having the same appearance, as an indicator representing the first key frame and an indicator representing the second key frame to be displayed on the time axis, wherein appearances of the indicator representing the first key frame and the indicator representing the second key frame are different from an indicator representing the other key frames to which a display form of the object different from appearances of a display form of the object at the first key frame and the second key frame of the already set one or more key frames is instructed.

16. The medium according to claim 15, wherein the second key frame is a newly added key frame in a state when one or more key frames are set on the time axis and a display form of the object at each of the set one or more key frames is instructed.

17. The medium according to claim 15, wherein said displaying step changes, in accordance with the second instruction that has been received in said receiving step for assigning, to the second key frame, reference information to a display form of the object instructed to the first key, a color of the indicators representing the first key frame and the second key frame so that the changed color is different from a color of the other indicators.

18. The medium according to claim 15, wherein said displaying step further provides a thumbnail image of a display form of the object associated with an indicator representing a key frame.

19. The medium according to claim 15, wherein said displaying step changes, in accordance with the second instruction that has been received in said receiving step for assigning, to the second key frame, reference information to a display form of the object instructed to the first key frame, a shape of the indicators representing the first key frame and the second key frame so that the changed shapes are different from shapes of the other indicators.

20. The medium according to claim 15, wherein said displaying step displays an indicator of a frame of which a display form of an object is shared with the set key frame, as a different indicator for each group that have the same display form of an object, based on the assigned reference information.

21. The medium according to claim 15, wherein said displaying step displays indicators having the same appearance, regardless of a reference destination of the reference information, as an indicator representing a key frame to which reference information is assigned in accordance with the second instruction, of one or more key frames disposed on the time axis.

* * * * *